United States Patent [19]
Park et al.

[11] Patent Number: 5,791,781
[45] Date of Patent: Aug. 11, 1998

[54] METHOD OF DETERMINING COLOR TEMPERATURE FOR COLOR DISPLAY DEVICE

[75] Inventors: Du-sik Park, Kyungki-do; Heui-keun Choh, Seoul, both of Rep. of Korea

[73] Assignee: Samsung Electronics Co., Ltd., Kyungki-do, Rep. of Korea

[21] Appl. No.: 741,711

[22] Filed: Oct. 31, 1996

[30] Foreign Application Priority Data

Nov. 1, 1995 [KR] Rep. of Korea ............ 95-39225
Jan. 15, 1996 [KR] Rep. of Korea ............ 96-636

[51] Int. Cl.$^6$ ............................................. G01J 1/00
[52] U.S. Cl. ...................... 374/159; 345/150; 348/655; 364/526
[58] Field of Search ........................... 345/150, 153, 345/207, 904; 348/655, 656, 658; 364/526, 557; 374/159, 163

[56] References Cited

U.S. PATENT DOCUMENTS

| | | | |
|---|---|---|---|
| 3,573,352 | 4/1971 | Fujita | 348/658 |
| 4,665,496 | 5/1987 | Ott | 364/526 |
| 5,023,814 | 6/1991 | Guillemin | 364/526 |
| 5,504,524 | 4/1996 | Lu et al. | 348/655 |
| 5,619,427 | 4/1997 | Ohkubo | 364/526 |
| 5,636,143 | 6/1997 | Takahashi | 364/526 |

*Primary Examiner*—G. Bradley Bennett
*Attorney, Agent, or Firm*—Rothwell, Figg, Erst & Kurz

[57] ABSTRACT

In determining a color temperature in a color display device, the present invention comprises the steps of: producing a patch set I composed of a plurality of patches which appear gray under respective illuminant components and producing a patch set II composed of a plurality of patches to be a metameric pair with a neutral gray emitted from the respective illuminant components, under a specific illuminant; visually detecting peripheral illuminant components by selecting patch having identical color to that of patch having an equivalent energy spectral reflection degree in the patch set I; and determining a color temperature of the display device from the patch set II by using the detected illuminant component. Thus, the present invention provides color temperature information in producing a profile of the device required by a CMS by determining the color temperature of the display device considering the peripheral illuminant component without using a colorimeter.

7 Claims, 6 Drawing Sheets

METHOD OF DETERMINING COLOR TEMPERATURE FOR COLOR DISPLAY DEVICE

BACKGROUND OF THE INVENTION

The present invention relates to a method of determining a color temperature for a color display device, and more particularly, to a method of determining a color temperature for visually detecting a peripheral illuminant component of a color display device and obtaining the color temperature for the display device by considering the same.

The color display device implemented by a cathode ray tube (CRT) or a liquid crystal display (LCD) is the most widely used for transmitting graphic information. In applied fields such as graphic arts, advertising, textile designs, and automobile designs, the color display device is required to display a specific color having a specific colorimetric parameter. Also, identical colorimetric parameters are used to reproduce such a color by other media such as inks, dyes, or paints. Well-known XYZ tristimulus values which are defined by the Commission Internatonale de l'Eclairage (CIE) are examples of such parameters.

The color reproduction characteristics of the display device must be known in order to display an optional specific color (a color having a specific colorimetric parameter or a point in a XYZ color space) on a color display device. The optional specific color is converted into a required voltage for reproduction in the display device according to the color reproduction characteristic of the display device concerned. The exactness of such a color conversion depends on the exactness of transform formulas, namely, the exactness of the definitions of the color reproduction characteristics of the respective display devices. A color management system (CMS) is suggested for the color conversion having a minimal color error among various inputting and outputting devices. The CMS requires a profile including the definition of the exact color reproduction characteristics of the respective devices for the color conversion. The chromaticity of a white point of the display device, i.e., the color temperature, is one important colorimetric parameter in preparing a profile of a CMS.

By conventional methods, a colorimeter is used to obtain the color temperature for the display device, which is preferable in obtaining an exact chromaticity coordinate value of the display device. The color temperature value of the display device obtained by using the colorimeter is the color temperature value of the pure display device itself in a condition excluding peripheral illuminant components. Therefore, this color temperature value does not reflect the peripheral illuminant components.

Generally, when a reproduced image is observed, actual conditions are remarkably different than when an image is obtained by using the colorimeter since the reproduced image is not directly seen in a dark room. Namely, because the peripheral illuminant always exists and the observer sees the reproduced image under the peripheral illuminant, the observer's eyes are adapted to two light sources, i.e., the peripheral illuminant and the display device. At this time, the color temperature for the display device is sensed to be different than that of the value obtained by the colorimeter. Therefore, a desired color matching cannot be performed without considering the difference between the colorimeter and the sight to such a color temperature.

SUMMARY OF THE INVENTION

It is an object of the present invention to provide a method of determining a color temperature for visually detecting a peripheral illuminant component of a color display device and obtaining the color temperature for the display device by considering the same.

As an aspect of the present invention, there is provided a method of determining a color temperature according to the present invention in the color display device, comprising the steps of: producing a patch set I composed of a plurality of patches which appear gray under respective illuminant components and producing a patch set II composed of a plurality of patches to be a metameric pair with a neutral gray emitted from the respective illuminant components, under a specific illuminant; visually detecting a peripheral illuminant component by selecting a patch having identical color to that of a patch having an equivalent energy spectral reflection degree in the patch set I; and determining a color temperature of said display device from the patch set II by using the detected illuminant component.

As another aspect of the present invention, there is provided a method of determining a color temperature according to the present invention in the color display device, comprising the steps of: producing a metameric color patch set composed of metameric pair patches which appear to be the same color as arbitrary reference patches under respective illuminant components; visually detecting a peripheral illuminant component by pair of patches which appear the same color among the metameric color patch set; and redetermining a white chromaticity of said display device in consideration of the detected illuminant component.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the attached drawings.

Figure 1:
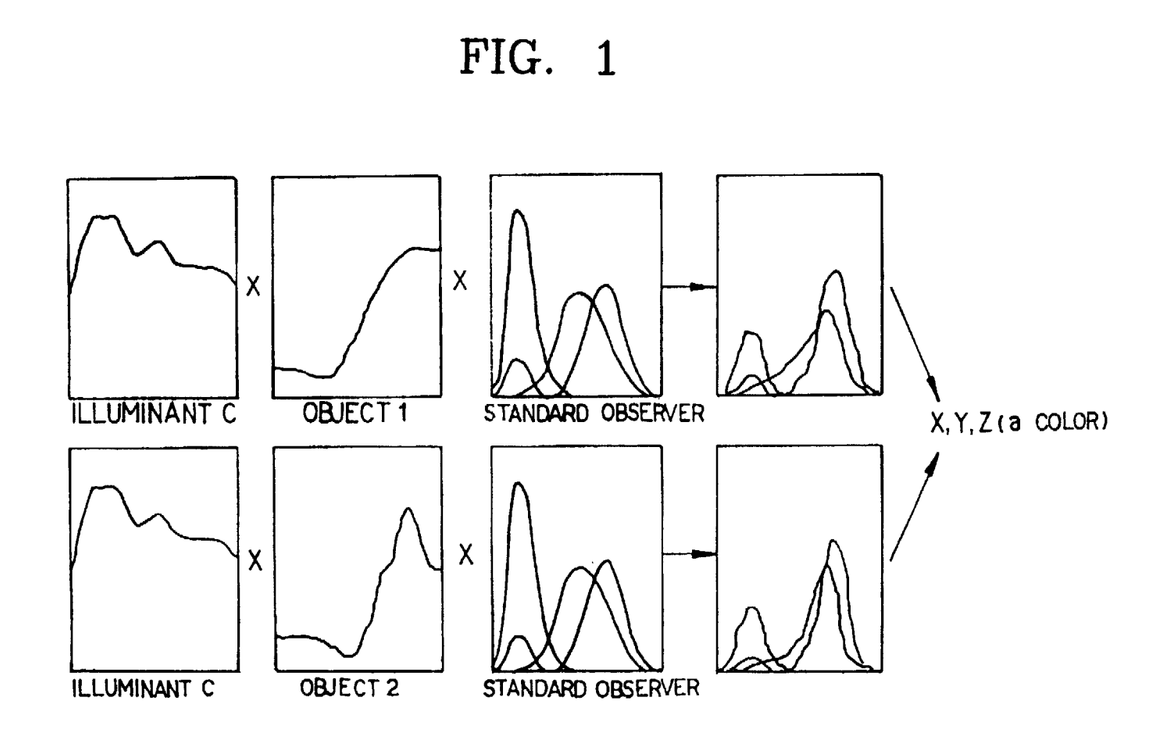
FIG. 1 is a graphic display of a color perception.

A color perceived by an observer is generally standardized to be displayed by XYZ tristimulus values (CIE 1931) as shown in FIG. 1. This is determined by multiplying the spectral power distribution (SPD) of a light source by the tristimulus spectrum of an object or a reflection degree, and a color matching function of human sight. The process is graphically shown in FIG. 1 and is expressed by the following formulas (1).

$$X = k \int S_\lambda O_\lambda \bar{x}_\lambda d\lambda$$
$$Y = k \int S_\lambda O_\lambda \bar{y}_\lambda d\lambda$$
$$Z = k \int S_\lambda O_\lambda \bar{z}_\lambda d\lambda$$
$$k = 100 / \int S_\lambda \bar{y}_\lambda d\lambda \quad (1)$$

In the above formulae (1), $SA_\lambda$, $O_\lambda$, and $x_\lambda$, $y_\lambda$, and $z_\lambda$ are the SPD values of the illuminant C, a reflection degree characteristic of an object, and color matching functions of a standard observer, respectively.

An observer perceives the colors of two objects as being the same in the case when the values of X, Y, Z are identical even through the two objects 1 and 2 have different spectral reflection degrees as illustrated in FIG. 1. This phenomenon is called a metameric phenomenon and the colors of the two objects which cause such a metameric phenomenon are called a metameric pair.

A method of determining a color temperature according to the present invention includes a step for obtaining a patch set for causing the metameric phenomenon, a step for detecting the illuminant by using the patch set and a step for obtaining the color temperature for the display device by using the patch set.

Figures 2, 3:
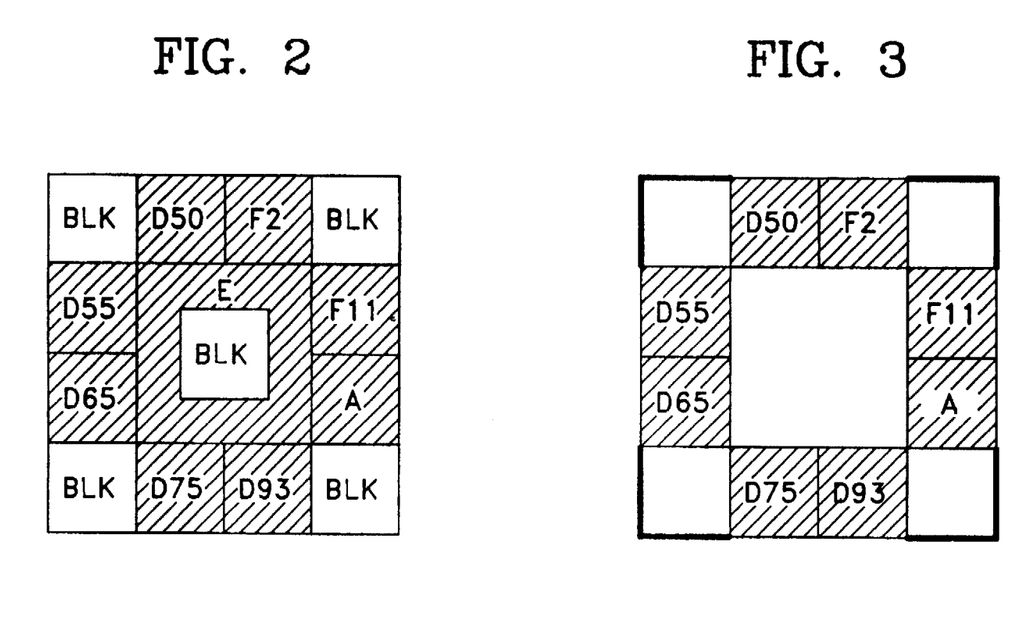
FIG. 2 shows a patch set I used for detecting an illuminant component in the first embodiment of the present invention.
FIG. 3 shows a patch set II used for determining a color temperature for a display device according to the first embodiment of the present invention.

FIG. 2 shows the first patch set used for detecting the illuminant component according to the first embodiment of the present invention. Gray patches, indicated by diagonal lines in the patch set, are produced by using inks or paints as follows. The patch E is produced to have a certain reflection degree at all frequencies in the visible spectrum. The patches A, F11, F2, D50, D55, D65, D75, and D93 are produced to look gray under standard illuminants A, F11, F2, D50, D55, D65, D75, and D93 (having color temperatures of 2856° K, 4000° K, 4200° K, 5000° K, 5500° K, 6500° K, 7500° K, and 9500° K respectively), respectively. In FIG. 2, BLKs indicate portions that are not marked.

The respective gray patches are produced to have certain density and arrangement as shown in FIG. 2, and are collectively called patch set I for detecting the illuminant component. More patches can be inserted in patch set I to obtain the illuminant component in greater detail.

FIG. 3 shows an example of the patch set II used for determining the color temperature of the display device according to the first embodiment of the present invention. The patches indicated by diagonal lines in the patch set are produced as follows.

The patch A is produced to be a metameric pair with a neutral gray emitted from the standard illuminant A under a specific illuminant. The patches F11, F2, D50, D55, D65, D75, and D93 are produced to be a metameric pair with the standard illuminants F11, F2, D50, D55, D65, D75, and D93, respectively. Here, the white portions which are not marked are produced by transparent membranes.

The patches of set II are produced to the respective illuminants of set I, for example, A, F11, F2, D50, D55, D65, D75, and D93.

The illuminant, which greatly influences human perception, is one of the important operational conditions of the system for color matching. Due to the influence of the peripheral illuminant, the color reproduced in the display device is perceived to have a different value than the value obtained by using the colorimeter. Therefore, because a color processing should be performed by considering the conditions under which an actual color perception occurs, it is very important to detect the illuminant component.

Figure 4:
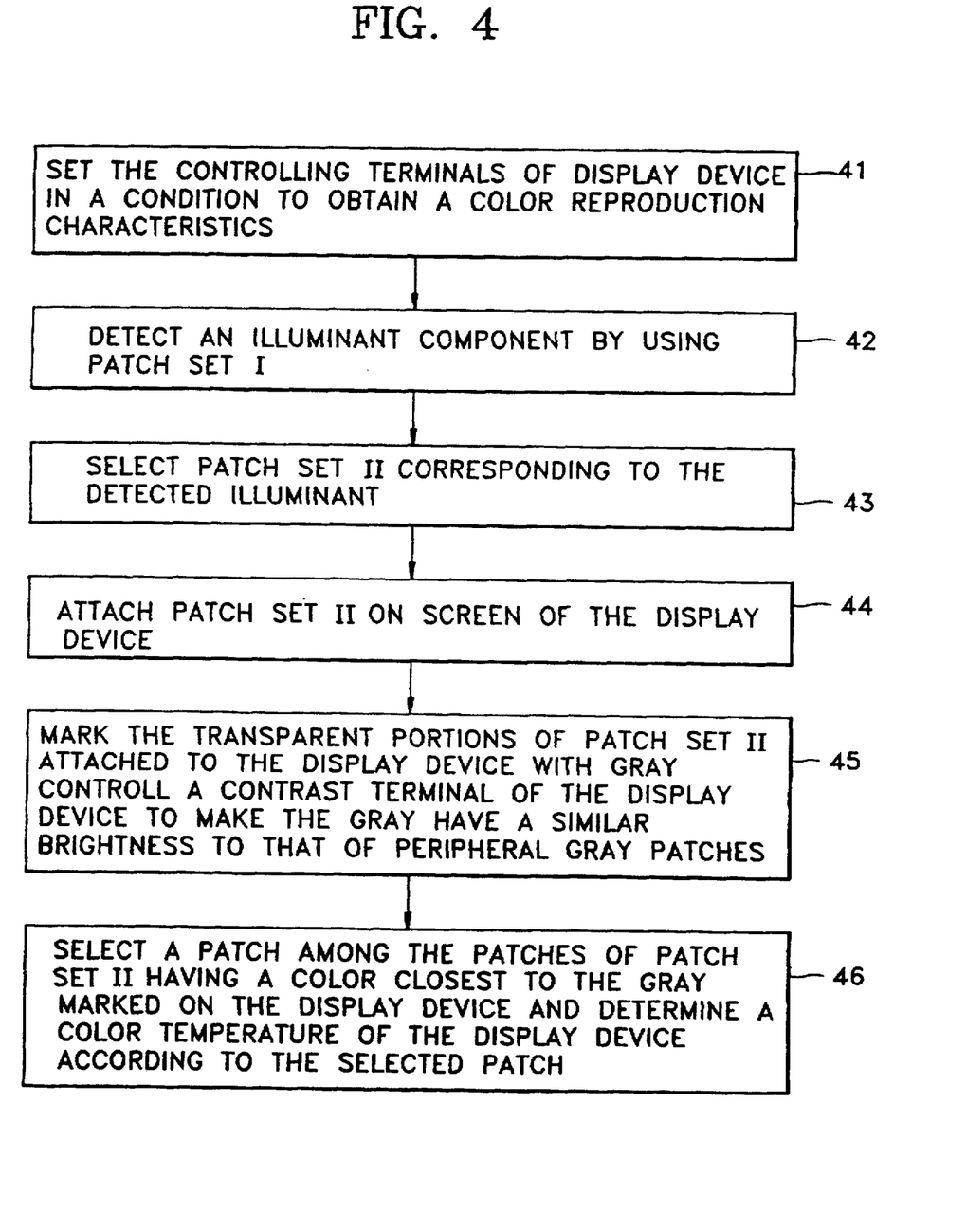
FIG. 4 is a flow chart for determining a color temperature in a display device according to the first embodiment of the present invention.

FIG. 4 is a flow chart for detecting the illuminant component and determining the color temperature for the display device in the first embodiment of the present invention comprising steps 41 and 42 for visually detecting the peripheral illuminant component and steps 43–46 for determining the color temperature for the display device concerned by using the detected illuminant component.

In step 41, all the controlling terminals of the display device are set up in a condition to a desired color reproduction characteristic. In step 42, the illuminant component is detected by using the patch set I as shown in FIG. 2. The process for detecting the illuminant component is described in detail with reference to FIG. 5.

Figure 5:
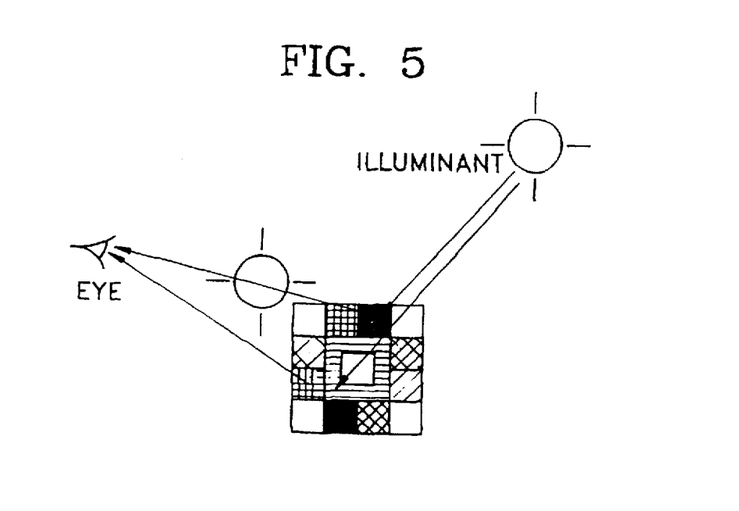
FIG. 5 shows an example of visually detecting an illuminant component according to the first embodiment of the present invention.

In FIG. 5, patch set I is used to obtain the illuminant component under specific conditions, wherein the patch having an identical color as that of patch E of patch set I, namely, patch E having an equivalent energy spectral reflection degree is selected. In such a case, the selected patch shows the present illuminant state; i.e., the names labeled to the respective patches are the illuminant components. For example, if the patches E and F2 seem identical in color (gray), the illuminant component is F2 and the remaining patches have different colors.

In step 43, the patch set II corresponding to the illuminant component detected in step 42 is selected, and then the selected patch set II is attached to a screen (step 44). In step 45, the transparent portions of patch set II attached to the display device are marked with gray and a contrast of the display device is controlled to have a brightness similar to that of the peripheral gray patches. In step 46, a patch having the closest color to the gray to be marked with respect to the display device is selected among the patches of patch set II and the color temperature for the display device is determined according to the selected patch. The process for determining the color temperature is described in detail with reference to FIG. 6.

Figure 6:
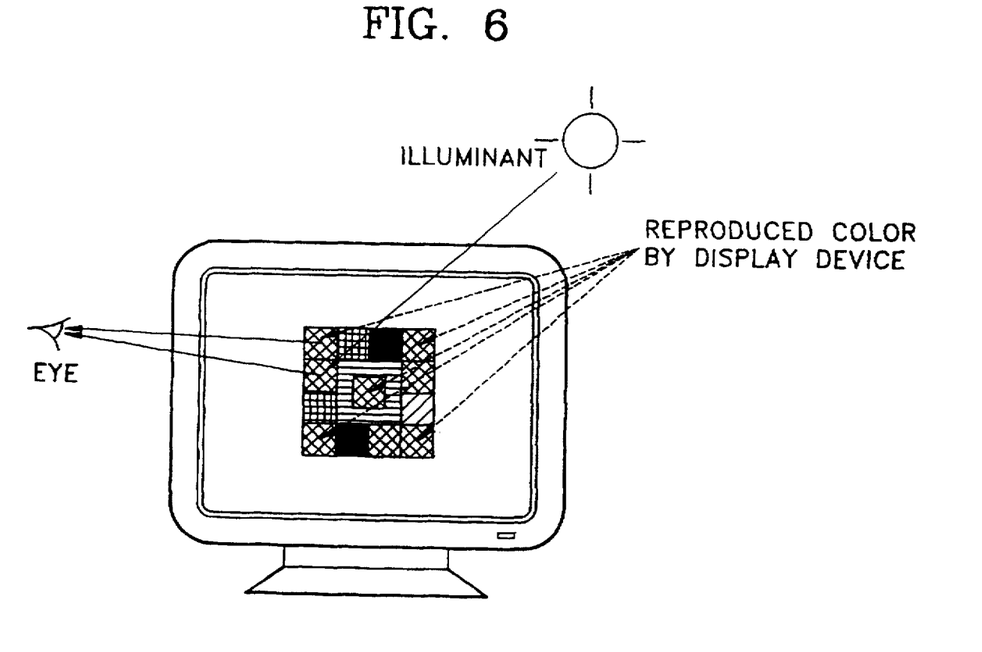
FIG. 6 shows an example of determining a color temperature for a display device according to the first embodiment of the present invention.

In FIG. 6, patch set II produced to correspond to the illuminant F2 detected in FIG. 5 is selected, the same is attached to the screen of the display device. The background of the display device is marked with 50% gray, and the portion whereto the patch is attached is marked with gray so as to have a similar brightness to that of the patch. Then, the contrast terminal of the display device is controlled to make the brightness of the gray of the display device seen through the transparent window of the patch set II uniform with that of the peripheral patches. At this time, it is possible to use the contrast terminal by properly controlling the same in an actual use as the chromaticity of the display device does not change according to the controlling of the contrast terminal. In such a case, the patch having the closest color to that of the display device is seen through the transparent window. For example, in the case that the selected patch is D65, the color temperature of the display device is D65.

Figure 7:
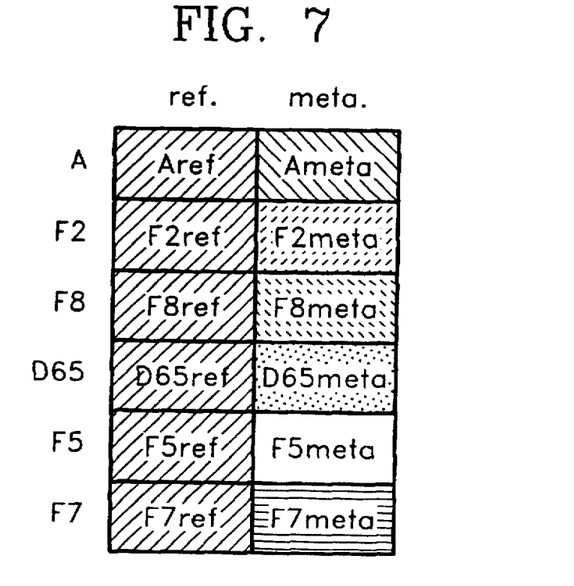
FIG. 7 shows a metameric color patch set used for detecting an illuminant component according to the second embodiment of the present invention.

FIG. 7 shows a metameric color patch set used for detecting an illuminant component. The metameric color patch set includes a plurality of reference patches designated by "ref" and a plurality of metameric pair patches designated by "meta". Also, A, F2, F8, D65, F5 and F7 shown in the left of the patch represent illuminant components. The reference patches are the same in each illuminant component as a specific color. That is, the reference patches of Aref, F2ref, F8ref, D65ref, F5ref and F7ref are the same in color. Also, each metameric pair color patch corresponding to the reference patches are shown in the same color as the reference patch under a corresponding illuminant component. Under one illuminant component, only a pair of the reference patch and the metameric pair patch is shown in the same color as each other.

For example, if the reference patch "F5ref" and the metameric pair patch "F5meta" are shown in the same color under a circumstance, a peripheral illuminant component is "F5". The peripheral illuminant component of a display device can be known using this metamerism. FIG. 7 shows an example, however, of how more metameric pairs can be used for detecting much more illuminant components. The metameric color patch set is manufactured using ink or paint, and the manufacturing condition is as follows.

A patch pair of "Aref" and "Ameta" is manufactured to be shown in the same color under a standard illuminant A (temperature of related color: 2856° K), and a patch pair of "F2ref" and "F2meta" is manufactured to be shown in the same color under a standard illuminant F2 (temperature of related color: 4200° K). Also, a patch pair of "F8ref" and "F8meta" is manufactured to be shown in the same color under a standard illuminant F8 (temperature of related color: 5000° K), and a patch pair of "D65ref" and "D65meta" is manufactured to be shown in the same color under a standard illuminant D65 (temperature of related color: 6500° K). Also, a patch pair of "F5ref" and "F5meta" is manufactured to be shown in the same color under a standard illuminant F5 (temperature of related color: 6350° K), and a patch pair of "F7ref" and "F7meta" is manufactured to be shown in the same color under a standard illuminant F7 (temperature of related color: 6500° K). Here, the metameric color patch set is manufactured for only a pair of patches to be shown in the same color under each illuminant component, and for each patch to be the same in concentration and gloss.

On the other hand, the illuminant component greatly influences a human's recognition characteristic as an important operation circumstance of a system used for color matching.

Actually, the color displayed in the display device is recognized as a different value from a value obtained by using a colorimeter due to the influence of the peripheral illuminant. Since a color processing should be performed in consideration of the real color recognizing circumstance, it is important to detect the illuminant component. A method for obtaining the peripheral illuminant component is shown in FIG. 8.

Figure 8:
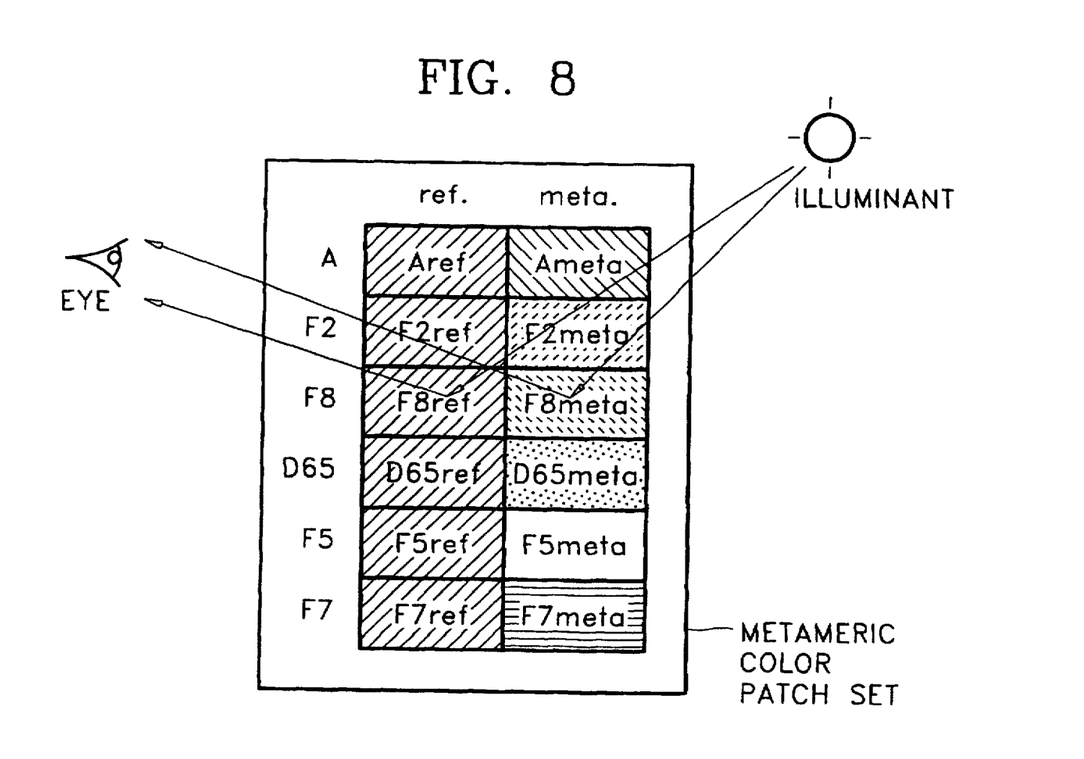
FIG. 8 shows an example of visually detecting an illuminant component according to the second embodiment of the present invention.

Referring to FIG. 8, the metameric color patch set is used for obtaining an illuminant component under a given circumstance. Here, a reference patch and a metameric patch pair which are shown as the same in color are searched in the metameric color patch set. The illuminant component can simply be detected from the patch pair which is shown as the same in color with each other in the metameric color patch set, since information about the illuminant component is declared in the left of the metameric color patch set.

Next, a method for determining a color temperature of a monitor according to the detected illuminant component will be described.

A color temperature may be expresses as white chromaticity in an xy chromaticity coordinate system. When characterizing the real display device, that is, detecting various chromaticity parameters with respect to a color display characteristic of the display device and then profiling the detected parameters, a CIE tristimulus value (X, Y, Z) of white color based on the white chromaticity is required instead of the color temperature.

Supposing that the white chromaticity of the display device is MCTxy and the chromaticity of peripheral illuminant component is VIxy, the MCTxy can be determined by measuring the white chromaticity of the display device using a colorimeter or by a setting of the display device. Currently, a part of the monitor set can be selected in order to cope with several color temperatures by itself. On the other hand, the VIxy is determined by detecting the peripheral illuminant component adopting the metameric color patch set as shown in FIG. 8. The light emitted from the screen of the display device and the peripheral illuminant component simultaneously enter into a human's eye, however, a human's perception with respect to the white color is different according to interaction between these two lights. A conversion ratio with respect to the white color according to the interaction between two lights is shown in the following formula (2).

$$APSR = \alpha TV_{dist} \quad \ldots (2)$$

In the above formula (2), APSR represents a ratio of the distance between two points, i.e., MCTxy and VIxy, in the chromaticity coordinate system, as a change of color which is perceived by a human as a white color according to the interaction between light emitted from the display device and the illuminant component. Here, $\alpha$ is 1.237 in the peripheral illuminant component having a moderate lightness (about 60 cd/m$^2$) and 0 when the peripheral illuminant component does not exist, which changes according to the lightness of the peripheral illuminant component. $TV_{dist}$ represents an Euclidian distance between MCTxy and VIxy. For example, supposing that a coordinate of $MCT_{xy}$ is (xt,yt) and a coordinate of $VI_{xy}$ is (xv,yv), $TV_{dist}$ is expressed as the following formula (3).

$$TV_{dist} = \sqrt{(xv-xt)^2 + (yv-yt)^2} \quad (3)$$

The change of color which is perceived by a human as a white color according to the interaction between the light emitted from the display device and the illuminant component occurs from MCTxy to VIxy. On the contrary, a change of the white point in the display device according to the adaptation of a human's eye occurs in the opposite direction to the change of color perceived as white color by a human, that is, from VIxy to MCTxy, by $APSR*TV_{dist}$.

On the other hand, the change of chromaticity in the display device is determined by the following procedure.

Figure 9:
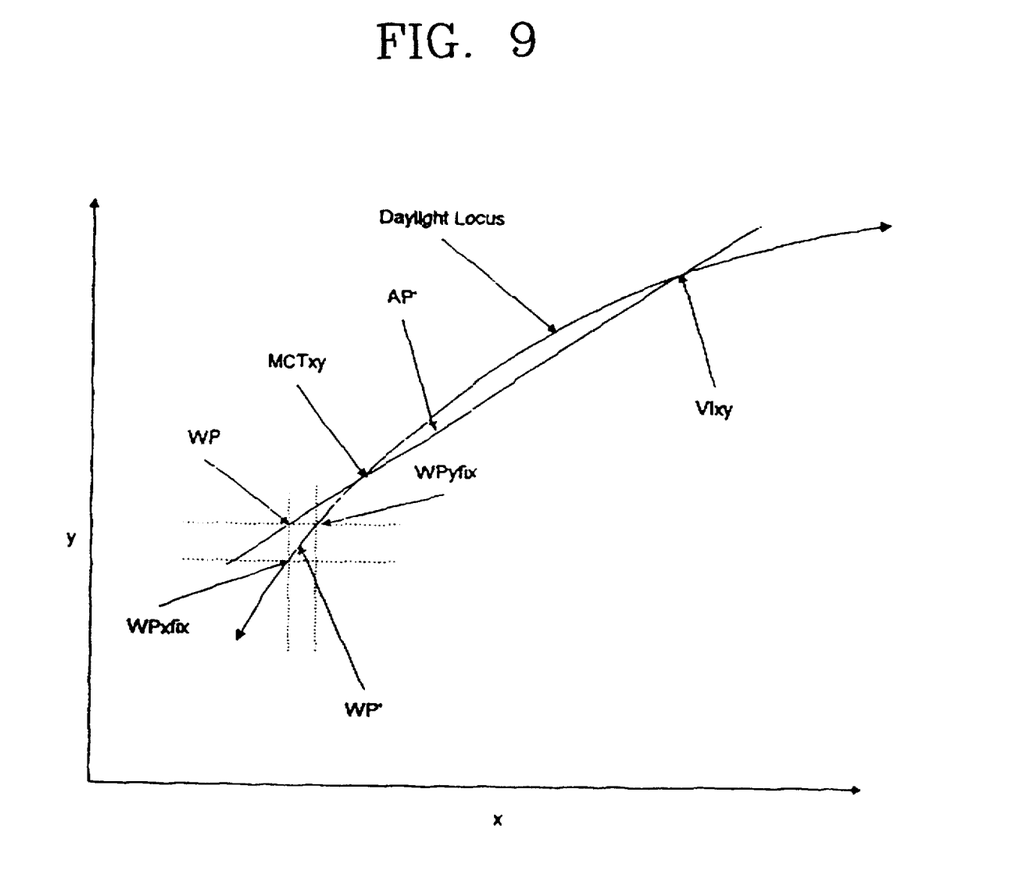
FIG. 9 represents a graph showing the change in white chromaticity of display device according to the second embodiment of the present invention.

First, a white point (WP) is shifted to a white point (WP) located in the reverse direction of VIxy from MCTxy by $APSR*TV_{dist}$, in a line connecting MCTxy and VIxy. Second, the WP is mapped to a point (WP') of the chromaticity coordinate system, which locates on a path of a light source, e.g., on a daylight locus. The mapped point WP' is a redetermined white chromaticity of the display device. That is schematically shown in FIG. 9.

The procedure for determining the white chromaticity of the display device, changed by the peripheral illuminant component, can be expressed as follows, by using the coordinate values shown in FIG. 9, and the coordinate values referred in the above formulas (2) and (3).

That is, if (xv−xt) is greater than 0, then the coordinate values (WPx, WPy) of WP become (xt−(APSR*$TV_{dist}$), yt−(APSR*$TV_{dist}$)). And, if (xv−xt) is smaller than 0, then the coordinate values (WPx, WPy) of WP become (xt+(APSR*$TV_{dist}$), yt+(APSR*$TV_{dist}$)).

Next, supposing that a cross point between a line from the WP, vertical with respect to the x-axis, and the path of the light source is WPxfix, and a point near the WP among cross points between a line from the WP, parallel to the x-axis, and the path of the light source, is WPyfix, the coordinate values of these points are obtained as follows. These points are one of points located on the path of the light source and the path of the light source can be expressed as the following formula (4).

$$y = -3.0x^2 + 2.870x - 0.275 \quad (4)$$

Also, a coordinate (x,y) of WPxfix can be expressed as the following formulas (5) and (6).

$$Wpxfix(x): Wxfx = WPx \quad (5)$$

$$Wpxfix(y): Wxfy = -3.0Wxfx^2 + 2.870Wxfx - 0.275 \quad (6)$$

On the other hand, a coordinate (x,y) of WPyfix can be expressed as the following formulas (7), (8) and (9).

$$WPyfix(y): Wyfy = WPy \quad (7)$$

$$WPyfix(x): Wyfx1 = [2.87 + \sqrt{2.87^2 - (12*0.275 + Wyfy)}]/6 \quad (8)$$

$$WPyfix(x): Wyfx2 = [2.87 - \sqrt{2.87^2 - (12*0.275 + Wyfy)}]/6 \quad (9)$$

Here, if (|WPx−Wyfx1|≦|WPx−Wyfx2|, Wyfx=Wyfx1 else, Wyfx=Wyfx2.

The chromaticity coordinate value of WP' from the above formulas (7) to (9) is determined by the following formula (10), in which a middle point existing in a line generated after linearizing interval between WPxfix and WPyfix is selected.

$$WP':(WP'x, WP'y) = (|Wxfx + Wyfx|/2|, |Wxfy + Wyfy|/2|) \quad (10)$$

That is, the white chromaticity of the display device is changed into WP' from MCTxy by the influence of the peripheral illuminant component. This WP' is used for describing the white chromaticity in the characterization of the display device.

As described above, the peripheral illuminant component is visually detected using patch set I and patch set II in the first embodiment of the present invention and the metameric color patch set in the second embodiment of the present invention. And then, the color temperature or the white chromaticity of the display device is redetermined in consideration of the influence of the detected peripheral illuminant. As a result, the color temperature of the display device under the consideration of the influence of the peripheral illuminant component is considered, that is, white chromaticity information, can be provided without using the colorimeter, when making a profile of the display device, required by a color matching system such as CMS. Therefore, when a white chromaticity, as one of the chromaticity parameters required for profiling the display device, is obtained by using the color temperature determining method of the present invention, visually more accurate color matching can be attained compared with a case where the color temperature obtained using various color-matching application software of a colorimeter such as CMS or a white chromaticity selected from a display device set from which the color temperature can be selected by a user is used.

What is claimed is:

1. A method of determining a color temperature in a color display device, comprising the steps of:

producing a patch set I composed of a plurality of patches which appear gray under respective illuminant components and producing a patch set II composed of a plurality of patches to be a metameric pair with a neutral gray emitted from said respective illuminant components, under a specific illuminant;

visually detecting peripheral illuminant components by selecting a patch in said patch set I having identical color to that of a patch having an equivalent energy spectral reflection degree in said patch set I; and determining a color temperature of said display device from said patch set II by using said detected illuminant component.

2. A method as claimed in claim 1, wherein said step of determining a color temperature further includes:

attaching the selected patch set II on a screen of the display device concerned after selecting the same corresponding to said detected illuminant component;

marking a transparent portion of the patch set II attached to the display device with gray and controlling a contrast of the display device to make the gray have a similar degree of brightness than that of peripheral gray patches; and selecting a patch having the closest color to the gray marked on said display device in the patch set II and determining a color temperature of the display device according to the selected patch.

3. A method of determining a color temperature in a color display device, comprising the steps of:

producing a metameric color patch set composed of metameric pair patches which appear the same color as arbitrary reference patches under respective illuminant components;

visually detecting a peripheral illuminant component by a pair of patches which appear to have the same color among said metameric color patch set; and redetermining a white chromaticity of said display device in consideration of said detected illuminant component.

4. A method as claimed in claim 3, wherein said step of redetermining a white chromaticity includes:

shifting white chromaticity MCTxy of the display device to a white point (WP) located in the reverse direction of chromaticity VIxy of the peripheral illuminant component from MCTxy by predetermined distance, in a line connecting MCTxy and VIxy; and mapping the white point (WP) to a point (WP') of a path of a light source, so that the white point (WP) is located on a path of a light source in the chromaticity coordinate system and determining the mapped point (WP') as the white chromaticity of the display device.

5. A method as claimed in claim 4, wherein said predetermined distance is obtained by multiplying a ratio of distance between MCTxy and VIxy, in the chromaticity coordinate system, as a change of color which is perceived by a human as a white color according to the interaction between light emitted from the display device and the illuminant component with an Euclidian distance between MCTxy and VIxy.

6. A method as claimed in claim 4, wherein position of the mapped point (WP') is set to a middle point of a line generated after linearizing interval between WPxfix and WPyfix, supposing that a cross point between a line from the WP, vertical with respect to the x-axis, and the path of the light source is WPxfix, and a point near the WP among cross points between a line from the WP, parallel to the x-axis, and the path of the light source, is WPyfix.

7. A method as claimed in claim 4, wherein a daylight locus is used as said path of the light source.

* * * * *

UNITED STATES PATENT AND TRADEMARK OFFICE
CERTIFICATE OF CORRECTION

PATENT NO. : 5,791,781
DATED : August 11, 1998
INVENTOR(S) : Du-sik Park et al.

It is certified that error appears in the above-indentified patent and that said Letters Patent is hereby corrected as shown below:

Col. 4, line 44, "is selected, the same" should be -- is selected and --.

Signed and Sealed this

Eleventh Day of May, 1999

Attest:

Attesting Officer

Q. TODD DICKINSON

Acting Commissioner of Patents and Trademarks